United States Patent
Takahashi et al.

(10) Patent No.: US 8,973,421 B2
(45) Date of Patent: Mar. 10, 2015

(54) COMPETENCE DIAGNOSIS SYSTEM FOR UREA WATER TEMPERATURE SENSOR

(75) Inventors: Hirotaka Takahashi, Fujisawa (JP); Yoshinori Hamaguchi, Fujisawa (JP); Masashi Mizutani, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 198 days.

(21) Appl. No.: 13/697,925

(22) PCT Filed: May 16, 2011

(86) PCT No.: PCT/JP2011/061208
§ 371 (c)(1),
(2), (4) Date: Nov. 14, 2012

(87) PCT Pub. No.: WO2011/145570
PCT Pub. Date: Nov. 24, 2011

(65) Prior Publication Data
US 2013/0055803 A1    Mar. 7, 2013

(30) Foreign Application Priority Data

May 17, 2010 (JP) ................................. 2010-113760

(51) Int. Cl.
*F01N 11/00* (2006.01)
*F01N 3/20* (2006.01)

(52) U.S. Cl.
CPC .............. *F01N 11/00* (2013.01); *F01N 3/2066* (2013.01); *F01N 2550/05* (2013.01); *F01N 2900/08* (2013.01); *F01N 2900/12* (2013.01); *F01N 2900/1811* (2013.01); *F01N 2900/1814* (2013.01); *Y02T 10/47* (2013.01); *Y02T 10/24* (2013.01)

USPC .................. 73/1.01; 73/114.69; 73/114.75

(58) Field of Classification Search
CPC ..................................................... G01M 15/00
See application file for complete search history.

(56) References Cited

U.S. PATENT DOCUMENTS 6,363,771 B1 * 4/2002 Liang et al. .................. 73/23.31
8,459,013 B2 * 6/2013 Hosaka et al. .................. 60/295

(Continued)

FOREIGN PATENT DOCUMENTS

JP     2000-303826     10/2000
JP     2009-79584      4/2009

(Continued)

OTHER PUBLICATIONS

International Search Report of Corresponding PCT Application PCT/JP2011/061208 mailed Aug. 16, 2011.
Patent Abstracts of Japan, Publication No. 2010-180753, published Aug. 19, 2010.

(Continued)

*Primary Examiner* — Eric S McCall
*Assistant Examiner* — Anthony W Megna Fuentes
(74) *Attorney, Agent, or Firm* — Staas & Halsey LLP

(57) ABSTRACT

A competence diagnosis system for a urea water temperature sensor that can prevent a misdiagnosis when urea water is replenished in a urea tank. The system includes a urea water level condition determination unit that stores a urea water level, which is measured by a level sensor provided in the urea tank, in a storage unit immediately before key-off, obtains a level difference between the urea water level stored in the storage unit and a current urea water level after key-on, and allows a diagnosis by the competence diagnosis unit through temperature comparison when the level difference is less than or equal to a predetermined threshold value.

1 Claim, 3 Drawing Sheets

(56) References Cited

U.S. PATENT DOCUMENTS

2010/0319651 A1* 12/2010 Kasahara .................. 123/198 R
2011/0225950 A1* 9/2011 McCoy et al. .................. 60/274

FOREIGN PATENT DOCUMENTS

| JP | 2010-180753 | 8/2010 |
| WO | WO 2009/098805 A1 | 8/2009 |

OTHER PUBLICATIONS

Patent Abstracts of Japan, Publication No. 2000-303826, published Oct. 31, 2000.
Patent Abstracts of Japan, Publication No. 2009-079584, published Apr. 16, 2009.
Written Opinion of the International Searching Authority mailed Aug. 16, 2011 in corresponding International Application No. PCT/JP2011/061208.

* cited by examiner

COMPETENCE DIAGNOSIS SYSTEM FOR UREA WATER TEMPERATURE SENSOR

CROSS-REFERENCE TO RELATED APPLICATIONS

This application claims the benefit of Japanese Patent Application No. 2010-113760, filed on May 17, 2010, the contents of which is incorporated herein by reference, which serves as priority for PCT Application No. PCT/JP2011/061208, filed May 16, 2011.

TECHNICAL FIELD

The present invention relates to a competence diagnosis system for a urea water temperature sensor that diagnoses a failure of a urea water temperature sensor for measuring a temperature of urea water stored in a urea tank.

BACKGROUND ART

As an exhaust gas purification system for purifying NOx in exhaust gas of a diesel engine, an SCR (Selective Catalytic Reduction) system using an SCR device has been developed.

The SCR system supplies urea water to an exhaust gas upstream of SCR, generates ammonia by the heat of the exhaust gas, and reduces and purifies NOx on an SCR catalyst by the ammonia (see, for example, Patent Document 1).

In the SCR system, a temperature of urea water stored in a urea tank is measured by a urea water temperature sensor provided in the urea tank. Thus, freezing of the urea water is detected, and thawing control is performed as necessary.

Since the temperature of the urea water cannot be measured when the urea water temperature sensor fails, the SCR system includes a competence diagnosis system for a urea water temperature sensor that diagnoses a failure of the urea water temperature sensor.

The competence diagnosis system diagnoses a failure of the urea water temperature sensor by comparing a temperature of the urea water measured by the urea water temperature sensor with an ambient temperature. Specifically, the competence diagnosis system compares a temperature of the urea water with an ambient temperature immediately after engine starting, and diagnoses the urea water temperature sensor as failed when a difference between the temperatures is more than a predetermined threshold value. Since there is no temperature sensor that directly measures an ambient temperature to be compared (it is not provided for economical reasons), for example, an intake manifold temperature or an MAF (Mass Air Flow) temperature measured by an MAF temperature sensor provided in an MAF sensor is used as the ambient temperature.

The reason for performing the diagnosis immediately after the engine starting is that it is expected that a temperature of the urea water inside the urea tank and an ambient temperature would be substantially the same immediately after the engine starting, and a failure of the urea water temperature sensor can be diagnosed by determining whether or not there is a significant difference between these temperatures.

PRIOR ART DOCUMENTS

Patent Document 1: Japanese Patent Application Publication No. 2000-303826

However, there is a case where the conventional competence diagnosis system misdiagnoses the urea water temperature sensor as failed even when the urea water temperature sensor has not failed. For example, when warm urea water stored in a room or the like is replenished at low ambient temperatures, a temperature of the urea water inside the urea tank rises and a temperature difference between a urea water temperature measured by the urea water temperature sensor and an ambient temperature increases according to a replenishment amount, so that there is a problem in that the urea water temperature sensor is misdiagnosed as failed.

SUMMARY OF THE INVENTION

Therefore, an object of the present invention is to provide a competence diagnosis system for a urea water temperature sensor that can prevent a misdiagnosis when urea water is replenished in a urea tank.

The present invention has been made in order to achieve the above object, and provides a competence diagnosis system for a urea water temperature sensor including a competence diagnosis unit that diagnoses a failure of a urea water temperature sensor provided in a urea tank by comparing a urea water temperature measured by the urea water temperature sensor with an ambient temperature, wherein the competence diagnosis system for a urea water temperature sensor includes a urea water level condition determination unit that stores a urea water level, which is measured by a level sensor provided in the urea tank, in a storage unit immediately before key-off, obtains a level difference between the urea water level stored in the storage unit and a current urea water level after key-on, and allows a diagnosis by the competence diagnosis unit through temperature comparison when the level difference is less than or equal to a predetermined threshold value.

According to the present invention, the misdiagnosis can be prevented when urea water is replenished in the urea tank.

DETAILED DESCRIPTION

Hereinafter, preferred embodiments of the present invention will be described with reference to the accompanying drawings.

First, an SCR system mounted on a vehicle will be described.

Figure 1:
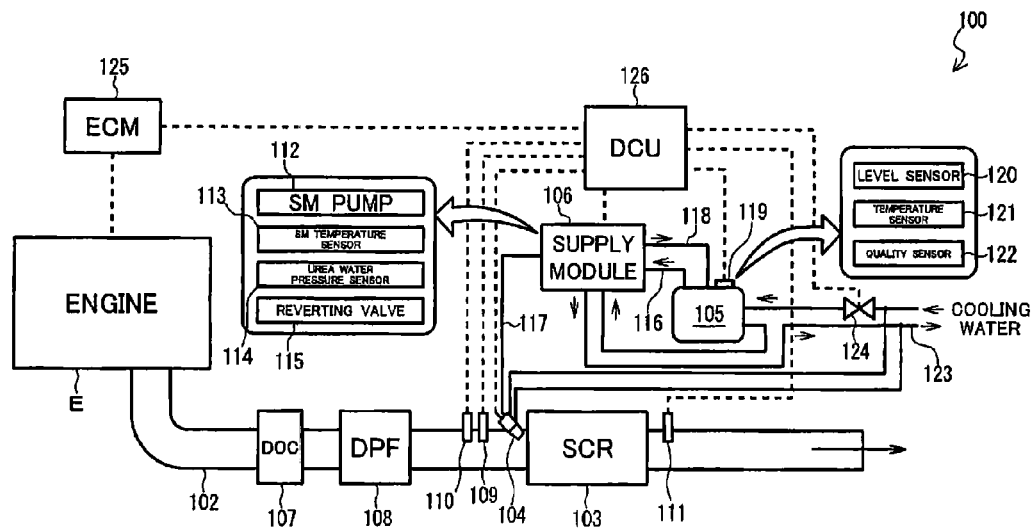
FIG. 1 is a schematic view showing an SCR system to which the present invention is applied.

As shown in FIG. 1, an SCR system 100 mainly includes an SCR device 103 provided at an exhaust pipe 102 of an engine E, a dosing valve (urea injection device, dosing module) 104 for injecting urea water on an upstream side of the SCR device 103 (upstream side of exhaust gas), a urea tank 105 for storing urea water, a supply module 106 for supplying the urea water stored in the urea tank 105 to the dosing valve 104, and a DCU (Dosing Control Unit) 126 for controlling the dosing valve 104, the supply module 106, and the like.

At the exhaust pipe 102 of the engine E, a DOC (Diesel Oxidation Catalyst) 107, a DPF (Diesel Particulate Filter) 108, and the SCR device 103 are sequentially arranged from the upstream side to the downstream side of exhaust gas. The DOC 107 generates $NO_2$ by oxidating NO in exhaust gas exhausted from the engine E, and increases a denitrification efficiency in the SCR device 103 by controlling a ratio of NO to $NO_2$ in the exhaust gas. Also, the DPF 108 traps a Particulate Matter (PM) in the exhaust gas.

The dosing valve 104 is provided at the exhaust pipe 102 on the upstream side of the SCR device 103. The dosing valve 104 is configured such that an injection nozzle is provided at a cylinder filled with high-pressure urea water, and a valve body plugging the injection nozzle is attached to a plunger. By pulling up the plunger by electrifying a coil, the valve body is separated from the injection nozzle, so that the urea water is injected. When electrifying the coil is stopped, the plunger is pulled down by an internal spring force and thus the valve body plugs the injection nozzle, so that the injection of the urea water is stopped.

An exhaust gas temperature sensor 109 for measuring a temperature of the exhaust gas in an inlet of the SCR device 103 (SCR inlet temperature) is provided at the exhaust pipe 102 on an upstream side of the dosing valve 104. Also, an upstream side NOx sensor 110 for detecting an NOx concentration in the upstream side of the SCR device 103 is provided on the upstream side of the SCR device 103 (herein, an upstream side of the exhaust gas temperature sensor 109), and a downstream side NOx sensor 111 for detecting an NOx concentration in the downstream side of the SCR device 103 is provided on the downstream side of the SCR device 103.

The supply module 106 includes an SM pump 112 for pumping the urea water, an SM temperature sensor 113 for measuring a temperature of the supply module 106 (temperature of the urea water flowing through the supply module 106), a urea water pressure sensor 114 for measuring a pressure of the urea water in the supply module 106 (pressure in a discharge side of the SM pump 112), and a reverting valve 115 for switching a flow passage of the urea water to switch whether or not to supply the urea water from the urea tank 105 to the dosing valve 104 or return the urea water inside the dosing valve 104 to the urea tank 105. Herein, when the reverting valve 115 is turned on, the urea water from the urea tank 105 is supplied to the dosing valve 104; and when the reverting valve 115 is turned off, the urea water inside the dosing valve 104 is returned to the urea tank 105.

When the reverting valve 115 is switched to supply the urea water to the dosing valve 104, the supply module 106 suctions the urea water inside the urea tank 105 by the SM pump 112 through a liquid feed line (suction line) 116, supplies the urea water to the dosing valve 104 through a pump line (pressure line) 117, and returns surplus urea water to the urea tank 105 through a recovery line (back line) 118.

The urea tank 105 is provided with an SCR sensor 119. The SCR sensor 119 includes a level sensor 120 for measuring a liquid surface height (level) of the urea water inside the urea tank 105, a temperature sensor 121 for measuring a temperature of the urea water inside the urea tank 105, and a quality sensor 122 for measuring a quality of the urea water inside the urea tank 105. The quality sensor 122 detects the quality of the urea water inside the urea tank 105 by detecting the concentration of the urea water or detecting whether or not a heterogeneous mixture is mixed in the urea water, for example, from a propagation speed of an ultrasonic wave or an electrical conductivity.

A cooling line 123 for circulating cooling water for cooling the engine E is connected to the urea tank 105 and the supply module 106. The cooling line 123 performs heat exchange between the cooling water flowing through the urea tank 105 into the cooling line 123 and the urea water inside the urea tank 105. Likewise, the cooling line 123 performs heat exchange between the cooling water flowing through the supply module 106 into the cooling line 123 and the urea water inside the supply module 106.

The cooling line 123 is provided with a tank heater valve (coolant valve) 124 for switching whether or not to supply the cooling water to the urea tank 105 and the supply module 106. In addition, although the cooling line 123 is also connected to the dosing valve 104, the cooling water is supplied to the dosing valve 104 regardless of the on/off of the tank heater valve 124. In addition, although not shown in FIG. 1 for simplicity, the cooling line 123 is disposed along the liquid feed line 116, the pump line 117, and the recovery line 118 through which the urea water flows.

Figure 2:
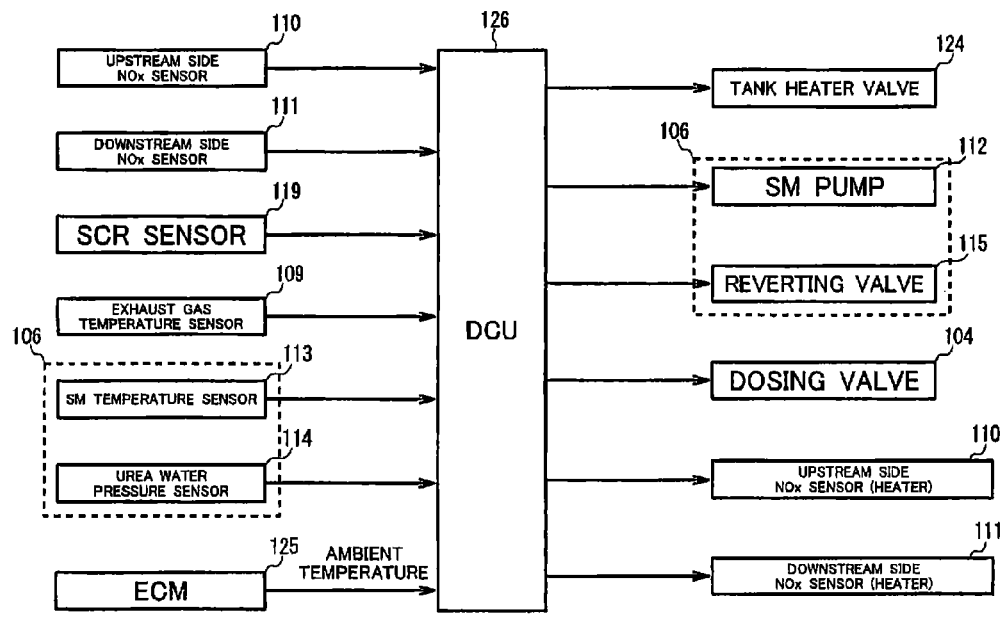
FIG. 2 is a diagram showing an input/output configuration of a dosing control unit ("DCU").

FIG. 2 shows an input/output configuration diagram of the DCU 126.

As shown in FIG. 2, an input signal line from an ECM (Engine Control Module) 125 controlling the upstream side NOx sensor 110, the downstream side NOx sensor 111, the SCR sensor 119 (level sensor 120, temperature sensor 121, quality sensor 122), the exhaust gas temperature sensor 109, the SM temperature sensor 113 and the urea water pressure sensor 114 of the supply module 106, and the engine E is connected to the DCU 126. Signals of the ambient temperature and engine parameters (the number of rotations of the engine, and the like) are input from the ECM 125.

Also, output signal lines to the tank heater valve 124, the SM pump 112 and the reverting valve 115 of the supply module 106, the dosing valve 104, a heater of the upstream side NOx sensor 110, and a heater of the downstream side NOx sensor 111 are connected to the DCU 126. Also, the input/output of signals between the DCU 126 and the respective members may be any one of the input/output through separate signal lines and the input/output through a CAN (Controller Area Network).

The DCU 126 estimates an amount of NOx in the exhaust gas based on the engine parameter signals from the ECM 125 and the temperature of the exhaust gas from the exhaust gas temperature sensor 109, and determines an amount of urea water to be injected from the dosing valve 104 based on the estimated amount of NOx in the exhaust gas. In addition, when the determined amount of urea water is injected by the dosing valve 104, the DCU 126 controls the dosing valve 104 based on the detection value of the upstream side NOx sensor 110 to adjust the amount of urea water to be injected from the dosing valve 104.

In the SCR system 100, a temperature of the urea water stored in the urea tank 105 is measured by a urea water temperature sensor (in this embodiment, the temperature sensor 121 provided in the SCR sensor 119), and thawing control is performed as necessary when freezing of the urea water is detected. Since the temperature of the urea water cannot be measure when the urea water temperature sensor 121 fails, the SCR system 100 includes a competence diagnosis system for a urea water temperature sensor (hereinafter, simply referred to as a competence diagnosis system) that diagnoses a failure of the temperature sensor 121.

Figure 3:
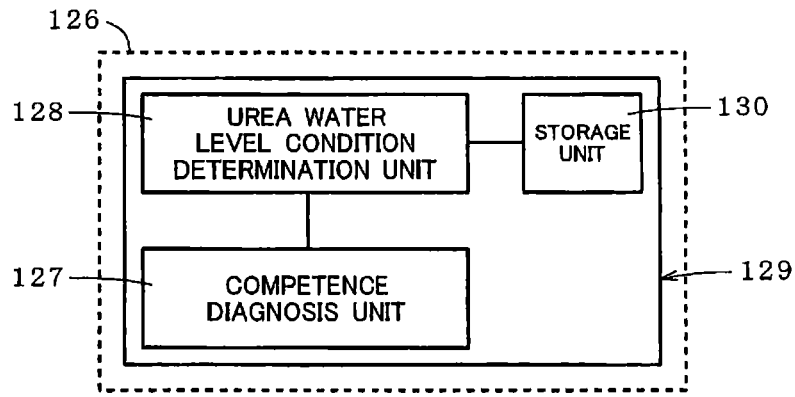
FIG. 3 is a diagram showing a configuration of a urea water level condition determination unit according to the present invention.

As shown in FIG. 3, the competence diagnosis system 129 includes a competence diagnosis unit 127 that diagnoses a failure of the temperature sensor 121 by comparing a urea water temperature measured by the temperature sensor 121 with an ambient temperature. The competence diagnosis unit 127 is mounted in the DCU 126.

The competence diagnosis unit 127 confirms no abnormality related to an ambient temperature, no abnormality related to the level sensor 120 measuring a urea water level, and no circuit abnormality of the temperature sensor 121, which are data transmitted from the ECM 125 through the CAN (CAN data), and determines whether it is immediately after engine starting, based on a battery voltage being a parameter included in the DCU 126 and a lapse time measured by an engine run timer.

Herein, the engine run timer is used to measure a lapse time after the engine starting. For example, when an engine rpm (revolutions per minute) becomes more than or equal to a predetermined rpm, the engine run timer determines it as engine starting and starts to count, and when the engine rpm becomes less than or equal to the predetermined rpm (for example, 25 rpm), the engine run timer resets the count.

Also, since generally there is no temperature sensor that directly measures an ambient temperature (it is not provided for economical reasons), for example, an intake manifold temperature or an MAF temperature measured by an MAF temperature sensor provided in an MAF sensor is used as the ambient temperature.

Also, when determining that it is immediately after the engine starting, the competence diagnosis unit 127 compares the urea water temperature obtained by the temperature sensor 121 with the ambient temperature. Also, when determining that it is not immediately after the engine starting, the competence diagnosis unit 127 does not diagnose a failure of the temperature sensor 121.

In addition, as a result of the comparison of the urea water temperature with the ambient temperature, when a difference between the temperatures is more than a predetermined threshold value, the competence diagnosis unit 127 diagnoses the temperature sensor 121 as failed.

In this manner, the competence diagnosis system 129 diagnoses a failure of the temperature sensor 121 by allowing the diagnosis with only the condition of immediately after the engine starting. However, for example, when warm urea water stored in a room or the like is replenished at low ambient temperatures, a temperature of the urea water inside the urea tank 105 rises and a temperature difference between a urea water temperature measured by the temperature sensor 121 and an ambient temperature increases according to a replenishment amount, so that there is a problem in that the temperature sensor 121 is misdiagnosed as failed.

Therefore, the present inventors provided the competence diagnosis system 129 with a urea water level condition determination unit 128 that allows the diagnosis by the competence diagnosis unit 127 based on a urea water level inside the urea tank 105.

The urea water level condition determination unit 128 stores a urea water level, which is measured by a urea water level sensor provided in the urea tank 105 (in this embodiment, the level sensor 120 provided in the SCR sensor 119), in a storage unit 130 immediately before key-off (ignition off, vehicle stopping), obtains a level difference between the urea water level stored in the storage unit 130 and a current urea water level after key-on (ignition on; vehicle starting), and allows the diagnosis by the competence diagnosis unit 127 through temperature comparison when the level difference is less than or equal to a predetermined threshold value. The reason for storing the measured urea water level in the storage unit 130 immediately before the key-off is that the urea water level cannot be measured after the key-off because the SCR sensor 119 is turned off by the key-off. Also, the storage unit 130 is implemented by, for example, a rewritable medium such as an EEPROM.

Figure 4:
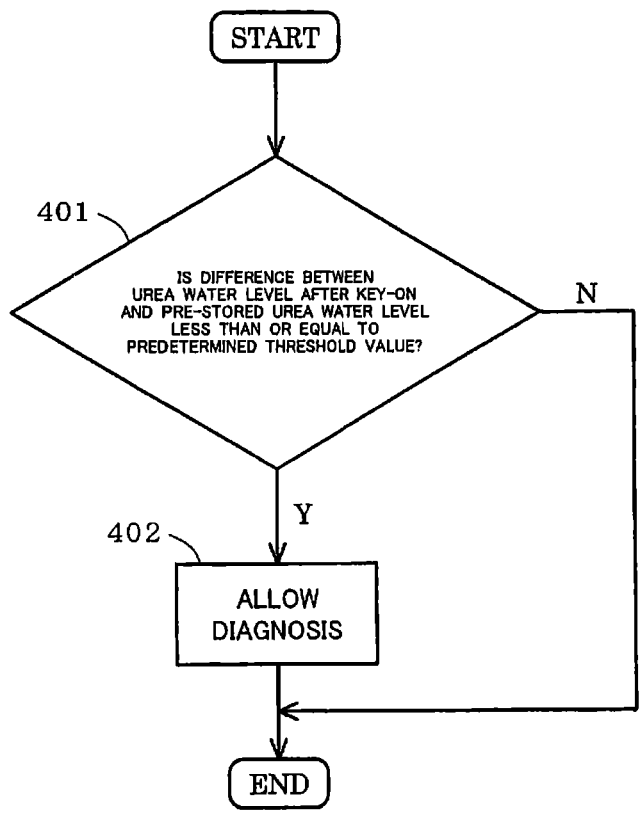
FIG. 4 is a flowchart showing an operation of the urea water level condition determination unit according to the present invention.

FIG. 4 shows a flowchart summarizing the operation of the urea water level condition determination unit 128.

As illustrated in FIG. 4, the urea water level condition determination unit 128 compares a current urea water level inside the urea tank 105 measured by the level sensor 120 of the SCR sensor 119 after key-on and a urea water level stored in the storage unit 130 immediately before key-off, and determines whether or not a level difference between the urea water levels is less than or equal to a predetermined threshold value (step 401). Also, when the urea water level is not stored in the storage unit 130 at an initial diagnosis or the like, the urea water level condition determination unit 128 does not allow the diagnosis by the competence diagnosis unit 127 and ends the operation.

When determining in step 401 that the level difference is more than the predetermined threshold value, the urea water level condition determination unit 128 does not allow the diagnosis by the competence diagnosis unit 127 and ends the operation. Also, when determining in step 401 that the level difference is less than or equal to the predetermined threshold value, the urea water level condition determination unit 128 allows the diagnosis by the competence diagnosis unit 127 (step 402).

By this operation, the urea water level condition determination unit 128 allows a diagnosis of the urea water temperature sensor only when the urea water level inside the urea tank 105 has not changed substantially.

Figure 5:
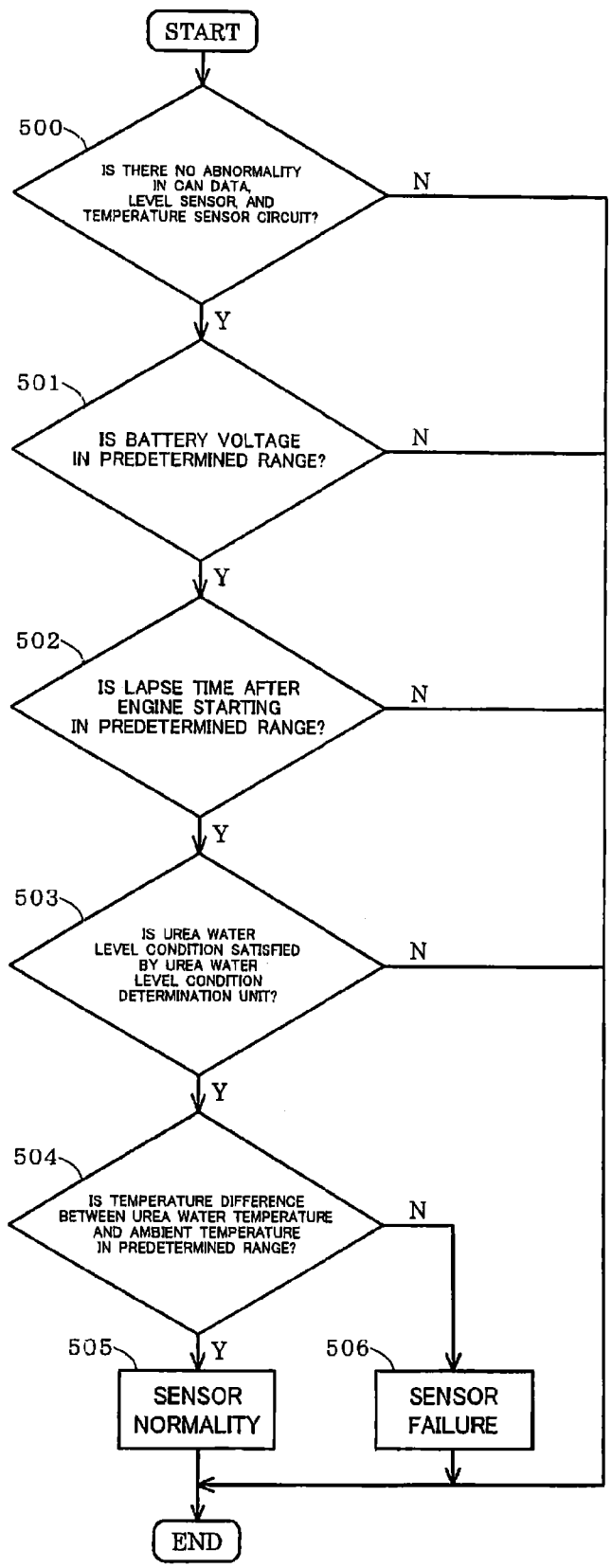
FIG. 5 is a flowchart illustrating an operation of a competence diagnosis system for a urea water temperature sensor according to the present invention.

An operation of the competence diagnosis system for a urea water temperature sensor 129 including the urea water level condition determination unit 128 will be described with reference to FIG. 5.

First, the competence diagnosis unit 127 included in the competence diagnosis system 129 confirms no abnormality related to an ambient temperature, no abnormality related to the level sensor 120 measuring a urea water level, and no circuit abnormality of the temperature sensor 121, which are CAN data (step 500), and ends the diagnosis when there is an abnormality.

When confirming in step 500 that there is no abnormality, the competence diagnosis unit 127 determines whether or not a battery voltage being a parameter included in the DCU 126 is in a predetermined range (step 501).

When determining in step 501 that the battery voltage is out of the predetermined range, the competence diagnosis unit 127 does not diagnose the temperature sensor 121 and ends the process.

Also, when determining in step 501 that the battery voltage is in the predetermined range, the competence diagnosis unit 127 determines whether or not a lapse time measured by the engine run timer is in a predetermined range (step 502).

When determining in step 502 that the lapse time measured by the engine run timer is out of the predetermined range, the competence diagnosis unit 127 does not diagnose the temperature sensor 121 and ends the process.

Also, when determining in step 502 that the lapse time measured by the engine run timer is in the predetermined range, the competence diagnosis unit 127 determines whether or not a urea water level-based diagnosis allowance condition (urea water level condition) is satisfied by the urea water level condition determination unit 128 according to the flowchart shown in FIG. 4 (step 503).

When determining in step 503 that the urea water level condition is satisfied by the urea water level condition determination unit 128, the competence diagnosis unit 127 compares a urea water temperature obtained by the temperature sensor 121 with a minimum value among ambient temperatures measured within a predetermined time after the establishment of the urea water level condition (step 504). Herein, the minimum value among the ambient temperatures measured within the predetermined time after the establishment of the urea water level condition is used to minimize an influence on the diagnosis result. That is, when a car has started to run during the diagnosis, there is a possibility that an intake manifold temperature or an MAF temperature as an ambient temperature will rise, thus significantly influencing the diagnosis result. However, by using the minimum value, these influences can be eliminated.

When determining in step 504 that a difference between the urea water temperature and the ambient temperature is less than or equal to a predetermined threshold value, the competence diagnosis unit 127 determines that the temperature sensor 121 is normal (step 505).

When determining in step 504 that the difference between the urea water temperature and the ambient temperature is more than the predetermined threshold value, the competence diagnosis unit 127 determines that the temperature sensor 121 is failed (step 506). Also, the failure determination may be performed first when these steps are repeated and a failure determination is made successively a plurality of times.

In this manner, the competence diagnosis system 129 of the present invention determines whether or not the urea water level condition is satisfied by the urea water level condition determination unit 128, in addition to the conventional diagnosis allowance condition of steps 501 and 502. Therefore, the diagnosis is not performed when urea water is replenished in the urea tank 105. Accordingly, it is possible to prevent a misdiagnosis that the temperature sensor 121 HAS failed even when the temperature sensor 121 has not failed.

The invention claimed is:

1. A competence diagnosis system for a urea water temperature sensor in a vehicle, comprising:
   a level sensor provided at a urea water tank to detect a level of urea water in the tank;
   a temperature sensor provided at the urea water tank to detect a temperature of the urea water in the tank;
   a urea water level determination device configured to—
      store in a storage device a urea water level of the tank detected by the level sensor immediately before an ignition of the vehicle is turned off,
      determine a level difference between a urea water level of the tank detected by the level sensor after the vehicle ignition is turned on and the stored urea water level, and
      determine a temperature difference between a urea water temperature detected by the temperature sensor and an ambient temperature;
   a competence diagnosis device to diagnose the urea water temperature sensor configured to—
      determine the temperature sensor is normal, when the temperature difference is less than or equal to a first predetermined threshold value,
      and determine the temperature sensor has failed when the temperature difference is more than the first predetermined threshold value; and
   a device to prohibit the diagnosis device from diagnosing, when the level difference is more than a second predetermined threshold value.

\* \* \* \* \*